US008600573B2

(12) United States Patent
Black et al.

(10) Patent No.: US 8,600,573 B2
(45) Date of Patent: Dec. 3, 2013

(54) SYSTEM AND METHOD FOR MANAGING COLD LOAD PICKUP USING DEMAND RESPONSE

(75) Inventors: Jason Wayne Black, Clifton Park, NY (US); Harjeet Johal, Glenville, NY (US); Devon Leigh Manz, Rexford, NY (US); Reigh Allen Walling, Clifton Park, NY (US); William Jerome Burke, Louisville, KY (US)

(73) Assignee: General Electric Company, Niskayuna, NY (US)

( * ) Notice: Subject to any disclaimer, the term of this patent is extended or adjusted under 35 U.S.C. 154(b) by 152 days.

(21) Appl. No.: 12/972,226

(22) Filed: Dec. 17, 2010

(65) Prior Publication Data

US 2012/0158198 A1 Jun. 21, 2012

(51) Int. Cl.
*G05D 17/00* (2006.01)

(52) U.S. Cl.
USPC ............. 700/291; 700/9; 700/19; 700/297

(58) Field of Classification Search
USPC .................................. 700/291, 9, 19, 297
See application file for complete search history.

(56) References Cited

U.S. PATENT DOCUMENTS

| 3,129,358 | A | 4/1964 | Harbaugh et al. |
| 4,402,059 | A | 8/1983 | Kennon et al. |
| 5,696,695 | A | 12/1997 | Ehlers et al. |
| 5,973,899 | A | 10/1999 | Williams et al. |
| 6,747,368 | B2 * | 6/2004 | Jarrett, Jr. ........................ 307/31 |
| 7,265,957 | B2 | 9/2007 | Brucker |
| 7,595,567 | B1 | 9/2009 | Cannon et al. |
| 2008/0172242 | A1 * | 7/2008 | Hyatt ................................ 705/1 |

FOREIGN PATENT DOCUMENTS

EP 0003010 7/1979

OTHER PUBLICATIONS

Feltes et al., "Some Considerations in the Development of Restoration Plans for Electric Utilities Serving Large Metropolitan Areas" 2006 IEEE.*
Kumar et al., "DG Integrated Approach for Service Restoration Under Cold Load Pickup", 2009 IEEE.*
NZ17953/11 Examination Report, Dec. 16, 2011.
B. Ramanathan, "A Framework for Evaluation of Advanced Direct Load Control With Minimum Disruption," IEEE Transactions on Power Systems, vol. 23, No. 4, Nov. 2008, pp. 1681-1688.
T. Ericson, "Direct load control of residential water heaters," Elsevier, Energy Policy, vol. 37, pp. 3502-3511.

* cited by examiner

*Primary Examiner* — Carlos Ortiz Rodriguez
(74) *Attorney, Agent, or Firm* — Nitin N. Joshi

(57) ABSTRACT

A system and method for simultaneously restoring power to loads in a distribution network that experienced an outage. The pickup load on the feeder in the distribution network is estimated and the load limit on the feeder is determined. The load on the feeder is divided into groups based on the load limit. A restoration load control process is determined, and power is restored to each of the groups simultaneously based on the power restoration control process.

24 Claims, 4 Drawing Sheets

SYSTEM AND METHOD FOR MANAGING COLD LOAD PICKUP USING DEMAND RESPONSE

BACKGROUND

Power distribution systems are designed to handle peak consumer load, while still sparing some capacity to cover for contingency overloads and for projected growth of load. Under steady state operation, at any time, the load on the system depends upon the number of consumer appliances/loads that are in operation. A single end user imposes very high variability of load on the power system. Since different appliances are turned on/off at different times, the demand for electricity is highly erratic. However, the electric distribution grid or the distribution feeder sees the aggregate demand for electricity, which is smoothed out by demographic and temporal diversity. For distribution systems that provide power to a relatively large and diverse group of consumers, the peak electricity demand on the feeder may be 20-50% of the combined undiversified peak demands. An example would be the operation of the HVAC or air conditioning units that operate based on temperature set points, temperature dead bands, and duty cycles. With many thermostatic loads online, there is enough randomization in the above three parameters that will cause these units to turn on/off at different times, thus reducing the maximum instantaneous power demand compared to a scenario where a single HVAC system of equivalent size was operated. Furthermore, there is also appliance diversity within individual customer demand. This diversity is lost after an extended outage, which creates a sudden, large, undiversified power demand on the feeder that is much larger than the typical diversified feeder load.

When the system is not in a steady state operating condition, problems can arise due to loss of load diversity. One such condition is when the system is recovering from an extended period of outage or a cold load pickup event. Under such a situation, the feeder is required to respond to a very high surge in electricity demand because the temporal factor or time diversity in power demand (from the end users) is lost. This is because after an extended outage all of the appliances come online at the same time and demand their maximum rated power until their steady state is reached. For example, in the case of thermostatic loads, as the desired steady state temperature can be very different from the present temperature, especially after an extended outage, such appliances will remain in operation until the desired temperature is achieved. As a result, the power distribution system may see a large spike in power demand for an extended period of time. In addition, the energization of a distribution circuit may result in high in-rush currents due to transformer magnetization and motor starting. This further compounds to the peak current demand. Under some conditions, the over current relay may react to such high overloads, triggering circuit breakers to open the distribution feeder. Such triggering and redo sing of the distribution feeders is a nuisance and can cause delays in load pickup. Further, large currents flowing on the feeder for an extended period of time can adversely affect equipment life.

A lot of research has gone into development of strategies to address cold load pickup. Most of the strategies control the power demand under a cold load pickup event by energizing pockets of load, one at a time. The loads are grouped/sectionalized into distinct pockets and the power is restored to one pocket at a time. The energization of a load pocket is done after a certain time delay from the energization of the previous one. With such an approach, the power to the last group of loads can only be restored after a delay, when all the previous groups have been energized.

For these and other reasons, there is a need for the present invention.

BRIEF DESCRIPTION

A system and method for simultaneously restoring power to loads in a distribution network. The pickup load on the feeder in the distribution network is estimated and the load limit on the feeder is determined. The load on the feeder is divided into groups based on the load limit. A restoration load control process is determined, and power is restored to each of the groups simultaneously based on the power restoration control process.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to an energy management system and method to restore load on a distribution power system. While embodiments of the invention will be described in the context of energy or electric utilities and power grid operations, it will be appreciated by those skilled in the art that the system and method can be used for other purposes or utilities as well.

As used herein, the term "module" refers to software, hardware, or firmware, or any combination of these, or any system, process, or functionality that performs or facilitates the processes described herein.

Figure 1:
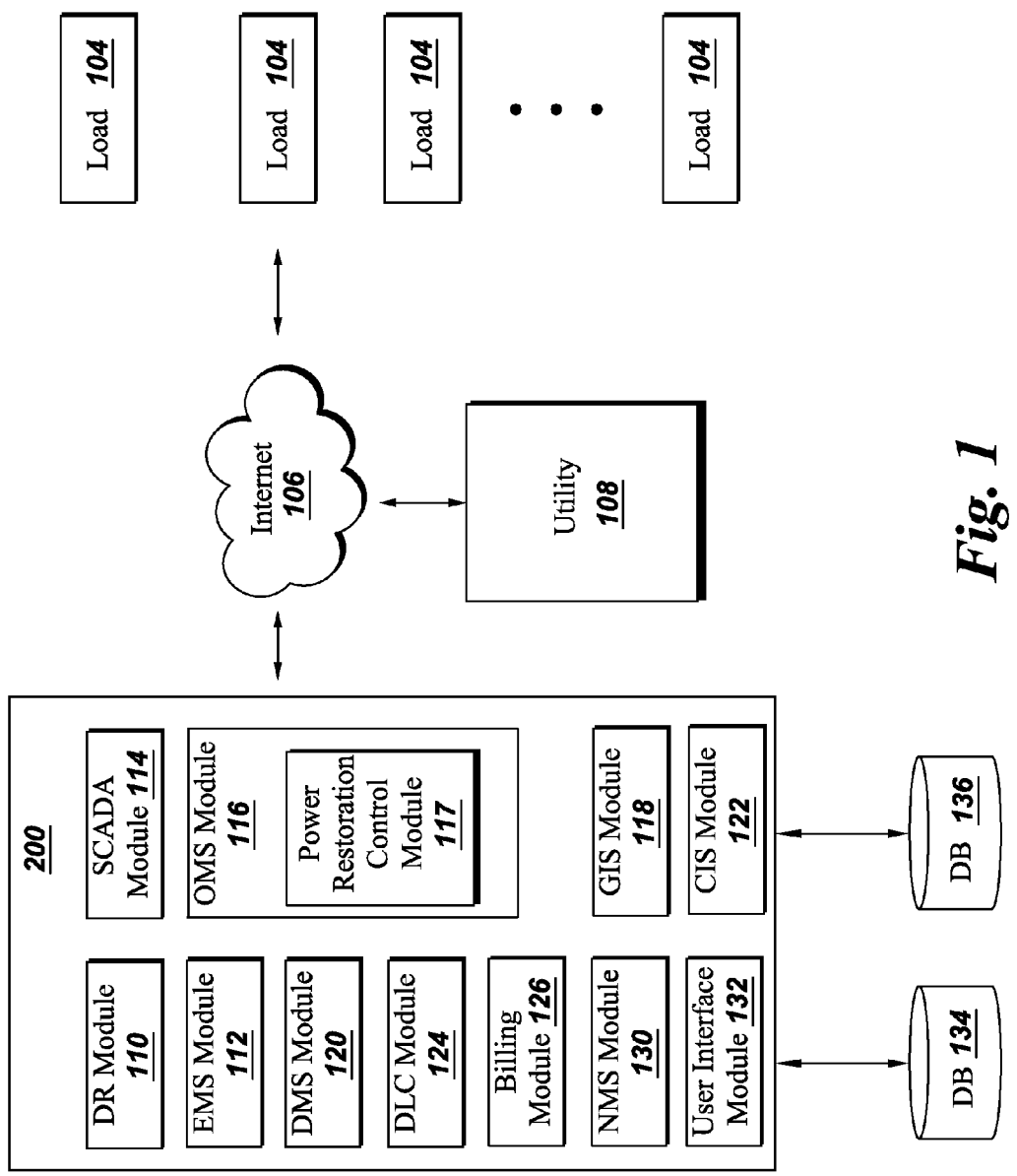
FIG. 1 illustrates a system according to an embodiment of the invention.
Figure 2:
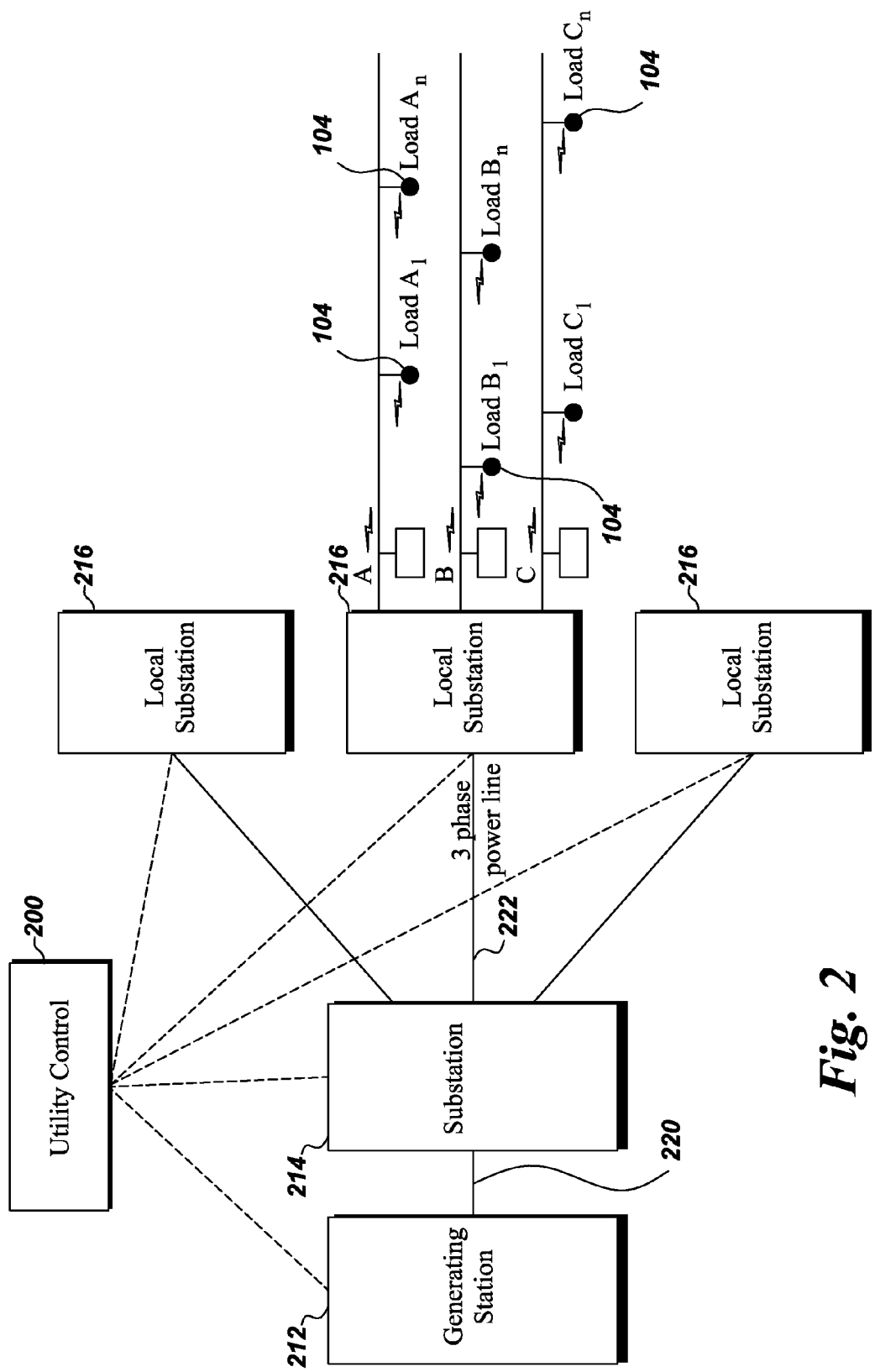
FIG. 2 illustrates a diagrammatical representation of an overall electric system.

FIG. 1 illustrates a general diagram of a power restoration system according to an exemplary embodiment for use with the system 200 shown in FIG. 2. As shown in FIG. 1, the utility control center 200 can be arranged at and/or hosted by the utility 108 and/or by any other party. For purposes of description a single utility 108, a single utility control center 200, and a small number of loads 104 are shown. However, it is to be understood that the system can include any suitable number of utility control centers 200, utilities 108 and loads 104. Communication between the premise sites or loads 104, the utility control center 200, and the utility 108 occurs via a WAN (e.g., Internet) 106, WiMAX, broadband, AMI, and/or power line carriers, for example. Communication can also occur via a private network. Any suitable means for communication can be used.

The utility control center 200 can include a Demand Response (DR) module 110, a Network Management Services (NMS) Module 130, a user interface module 132, a customer database (DB) 134, and a program database (DB) 136. The NMS module 130 provides communication management and provisioning for the DR module 110, the premises or loads 104 and the utility 108. The customer database 134 stores premise profiles for the customers in the network. Each premise profile includes data such as historical data for each premise in the network and information on participation in any demand response program, for example. The historical data can include information on customer utility usage including load type, time of use (TOU), duration of use, shed or demand response events, for example. The premise usage information stored in the database 134 can be updated periodically (e.g., hourly, daily) with load data, including hourly load and hourly price over a twenty four hour period, environmental data including weather information (e.g., temperature, humidity, wind speed, heating and cooling degrees, etc.) and date and time information such as day of the week, season, etc. In addition, the database 134 stores event data for each premise. More specifically, the database 134 stores historical information on whether a premise participated in a demand response event, the start time and end time, day of week, season, etc. In addition, the amount of load reduction and rebound are stored in database 134. Data related to response forecasting and expected future benefit calculations can also be stored in database 134. The user interface module 132 enables exchanging of information with an operator.

The utility control center 200 further includes an energy management system (EMS) module 112 that performs load forecasting for the network, and monitors, controls, and optimizes the performance of the generation and transmission system. A Supervisory Control And Data Acquisition (SCADA) module 114 provides real time information at different points in the grid and also provides local controls. SCADA usually refers to basic control and monitoring of field devices including breakers, switches, capacitors, reclosers, and transformers. The SCADA module 114 includes data collection computers at the control center 200 and remote terminal units (RTUs) in the field that can collectively monitor and control anywhere from hundreds to tens of thousands of data points. It also includes a user interface that is typically monitored around the clock. The user interface, in addition to one or more computer displays, usually includes a mapboard or large group displays to provide an overview of system status.

An Outage Management System (OMS) module 116 monitors load status information and outage restoration information for the loads 104 in the network. Some of the functions performed by the OMS module 116 include, but are not limited to, failure prediction, providing information on the extent of outages and impact to customers, and prioritizing restoration efforts. According to exemplary embodiments, the OMS module 116 includes a power restoration module 117 that manages the restoration of power to the loads 104 following an outage. The OMS module 116 operates based on a detailed network model of the distribution system that is generated and maintained by a Geographic Information Systems (GIS) module 118. A Distribution Management System (DMS) module 120 provides real-time response to adverse or unstable network conditions by providing information on load status and load response. The DMS module 120 manages the response to alarms and/or events. Customer information including service contract information, participation in incentive and/or demand response programs, and contract price information, for example, is monitored and controlled by the Customer Information System (CIS) module 122. A Direct Load Control (DLC) module 124 controls and manages customer site devices such as the thermostat—HVAC, water heater, pool pump, washer, dryer, dishwasher, LCD/Plasma TV, plug loads (e.g., computers, computer peripherals/accessories, fax machine, power supplies), refrigerator, and lighting, for example. These are mostly discrete types of devices that have on/off, eco-mode/normal mode, or multiple discrete power saving modes (e.g., dimmable lighting). Customer billing is performed by the billing module 126. In some embodiments, these components may be provided separately in system 100 rather than in the utility control center 200. For ease of discussion, only one utility control center 200 is shown, however, there can be any number of utility control centers as needed for performance.

FIG. 2 illustrates a single line diagram of an overall electric system from generation to utilisation. The electric system includes a generating station 212, a transmission substation 214, local substations or distribution substations 216 and loads 104. Generating station 212 may be any power generating station including, but not limited to, a hydropower generating station, a thermal power generating station, a wind power generating station or a solar power generating station, for example. Generating station 212 generates electricity at a generating station voltage. The electricity at transmission level voltage is transmitted to transmission substation 214 by extra high voltage (EHV) transmission lines 220. EHV transmission lines 220 carry electricity long distances to a substation. At transmission substation 214, a reduction in voltage occurs for distribution to other points in the system through high voltage (HV) transmission lines 222. Further voltage reductions for commercial and industrial or residential loads 104 take place at distribution substation 216.

The utility control center 200 is used in the system of FIG. 2 for operation and maintenance of generating station 212, transmission substation 214 and distribution substation 216. Utility control center 200 receives data from each of these components and also provides control signals to these components. It should also be noted here that the loads 104 communicate with their respective local substations 216 and thus, the utility control center 200 also receives and transmits information to and from the loads 104. In one embodiment, smart meters (not shown) facilitate communication between loads 104 and local substations 216. The communication modes between these various components can include fiber optics, power line carrier systems, and various wireless technologies. In exemplary embodiments, the loads can be any type of load including, but not limited to, any type of appliances or machines, sensors, renewables, and/or plug in electric vehicles (PEV) or plug in hybrid electric vehicles (PHEV), for example. In some embodiments, some of the loads can be arranged at premises and be controlled using any number of interfaces or protocols including Zigbee, Z-Wave, WiFi, or Homeplug, for example.

Embodiments disclosed herein provide a system and method for controlling the restoration of power or the power demand during a transient or cold load pickup condition through use of demand resources. The embodiments allow the loads on a distribution network to be slowly brought up to full power after an outage, so as to minimize the power drawn from the network. According to embodiments of the invention, power is restored to all of the loads in distribution network simultaneously, but their power consumption is slowly ramped up so as to facilitate easy restoration of the network.

Loads here refer to the aggregate power demand of a premise/household/commercial entity that comprises many appliances such as HVAC units, lighting, electronics, etc.

Restoring power to a feeder after a long duration outage is referred to as cold load pickup. After a long duration outage, the load diversity on a power system is lost. As all the loads on the power system are brought online, a very high power demand occurs. The high inrush currents from transformer energization and high starting currents of motors further compound to the increase in power demand. As an example, thermostatically controlled appliances including, but not limited to, water heaters, air conditioners, and HVAC units, come online at the same time as a feeder is restored after an extended outage. These appliances operate between controlled temperature limits and under steady state conditions they cycle on and off to maintain temperature between these limits. The duty cycle of operation depends on temperature set point, temperature limits, and ambient conditions. Typically, since large numbers of thermostatic controlled appliances are present on a distribution feeder, there is enough randomization in the cycling patterns of these appliances that the overall load factor remains relatively low. However, under cold load pickup conditions, all of the appliances will remain in the ON state until they reach their temperature set points; thus increasing the load factor on the feeder. The embodiments disclosed herein restore power by limiting the peak power demand on the feeder under cold load pickup, while restoring power to all the premises simultaneously. In this way, critical loads across all premises can be restored immediately, while individual, non-critical appliances within a household/entity are controlled in a way to limit the peak power demand.

In restoration of power under cold load pickup conditions, appropriate control of end user appliances 104 can manage their power usage to meet the constraints on the associated feeder. According to embodiments of the invention, power is restored to all premises simultaneously, and individual appliances are controlled by various methods including, but not limited to, turning appliances on and off or initiating control signals including, but not limited to, voltage control or pulse width modulation (PWM) switching. The individual appliances are controlled so as to prevent the excessively high loads typically created following an outage, where load diversity is lost.

According to some exemplary embodiments, power is restored at rated conditions to all critical appliances (i.e., lighting and other electronics, for example) simultaneously. Non-critical appliances (i.e., water heaters, dryers, for example) are slowly ramped up to rated conditions to manage the peak power flow on the feeder. For example, according to an exemplary embodiment, appliances belonging to premises participating in a demand response program including, but not limited to, critical peak pricing (CPP), Variable Peak Pricing (VPP), Direct Load Control (DLC), and/or other various incentive programs, are slowly ramped up/turned on to rated conditions, while other appliances are restored immediately to rated conditions.

In other exemplary embodiments, power is restored at reduced voltage. For example, this technique is effective in controlling the power demand of appliances, primarily resistive loads, by initiating signals to modulate the input voltage to these appliances. The power drawn by a resistive appliance is proportional to the square of the applied voltage. As the voltage is increased, the power drawn by the appliance increases, and vice versa. Under a cold load pickup condition, such resistive appliances can be triggered to start at reduced voltage, which will help to reduce the power by the square of the voltage. As the system progresses to reach steady state, the input voltage can be progressively increased to bring these appliances to normal rated conditions. This will help to reduce the peak power demand on the feeder, and at the same time assist in quickly restoring full power to other critical appliances.

If all the resistive appliances on a feeder turn on at the same time, i.e. there is no diversity in load, then the total instantaneous power demand from these appliance is given by:

$$P_{max} = N \times P_{nominal}$$

Where,

N is the total number of appliance $P_{nominal}$ is the nominal power demand of one appliance at $V_{rated}$.

Load diversity randomizes the turning on/off of appliances and as a result the total power drawn at any instant is less than $P_{max}$. Under a cold load pickup scenario, as $V_{rated}$ is applied to a resistive appliance, it remains in ON state till it reaches the desired steady state operating condition. The time taken to reach the steady state is dependent on a number of factors, such as the thermal capacity of the load, thermal conductance of the load to the surroundings/ambient, etc. During this entire period, the appliance draws $P_{nominal}$ power. In fact, the whole fleet of such appliances on a distribution feeder will demand $P_{nominal}$ until their steady state is reached.

This strategy enables restoration of power to the non-critical appliances at a reduced voltage. The voltage to these appliances is increased in a controlled fashion to limit the power demand on the feeder. This can be done either by (1) grouping the appliances into different pockets (based upon their location on the feeder, for example) and increasing the voltage of pockets (which will be controlled by a step-down transformer at the appliance level), one at a time, from the reduced level to rated conditions; or (2) Initiating control signals to slowly ramp up the input voltage to all the appliances (on the feeder) simultaneously from a reduced level to intermediate level(s) and then to rated conditions. This again will be accomplished through an auto-transformer action at the appliance level. It must be noted that the utility will restore the feeder at rated voltage. The additional hardware at the appliances will help to modulate the input voltage to the appliances and consequently their power. Appliances such as HVAC units, which are sensitive to low voltage operation, will not be suitable for participation in such a cold load pickup strategy.

Figure 3:
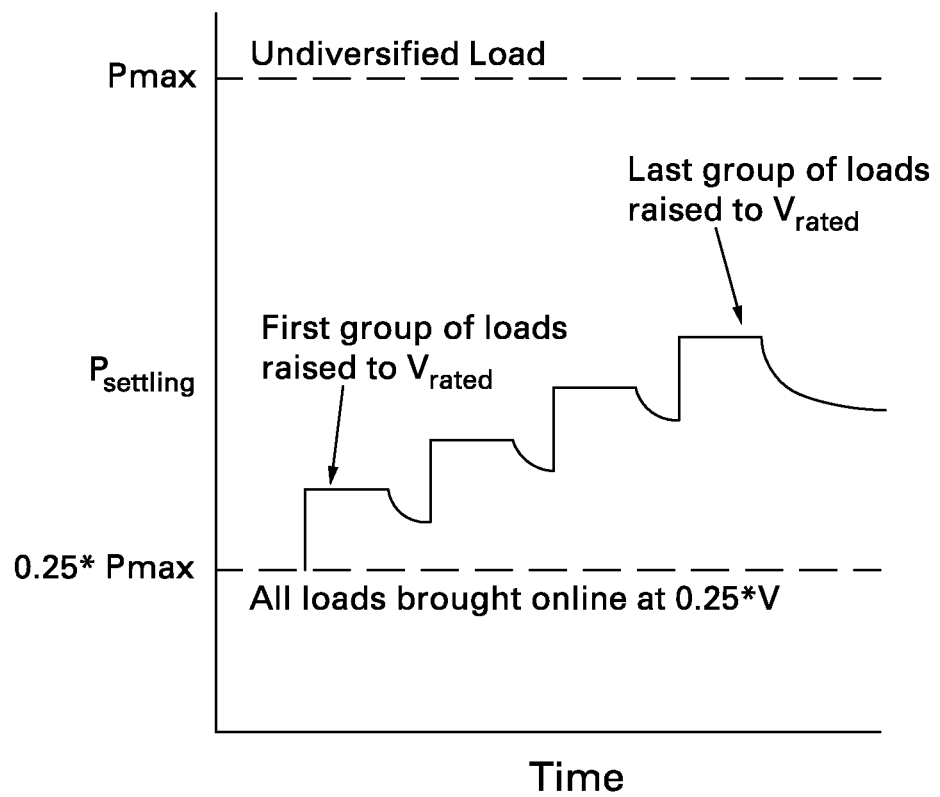
FIG. 3 illustrates a graph of restoring power to a load by voltage control according to an exemplary embodiment.

FIG. 3 illustrates restoring power at reduced voltage according to an exemplary embodiment. All of the appliances are brought online at a reduced voltage of 0.5 pu. As a result, the total power demand is 0.25*Pmax. The appliances are grouped into four load pockets. The voltage for the first 25% of the appliances is increased to the full rated voltage. As a result, there is an increase in the power demand until these appliances reach their steady state and then the power starts to fall as load diversity kicks in. The voltage to the next 25% of appliances on the feeder is then increased to the full rated voltage. Similar behavior of an initial increase and then a gradual drop in power demand is observed. Accordingly, the total power demand never reaches the Pmax value, which would be attained if all the appliances were brought online at rated conditions.

Certain parameters should be considered including, but not limited to, starting voltage to the appliances, size of the load pocket (in terms of power demand), and time interval between load pocket pick-up (or time interval between raising the voltage level of the appliances in a pocket or on the feeder). These parameters should be designed by offline studies on a distribution feeder, taking into account the constraints on voltage, current, and power, or by any other appropriate technique. There can be variations in the settings of the control parameters. For example, instead of having just two steps of voltage, a continuously increasing function of voltage can be applied to the appliances for increasing their power gradually. Also, instead of having multiple load pockets, the power of the entire (non-critical) load can be controlled by slow ramping of the input voltage at these appliances.

In another exemplary embodiment, power demand is maintained within limits in cold load pickup scenarios by controlling the control saturation of a population of devices that operate using synchronized low-frequency pulse width modulation (PWM). PWM is a commercially known technique that is commonly used to control power electronic switches, to shape the input voltage/current to a desired output requirement. This strategy can only be used on appliances that are equipped with a power electronic hardware.

Figure 4:
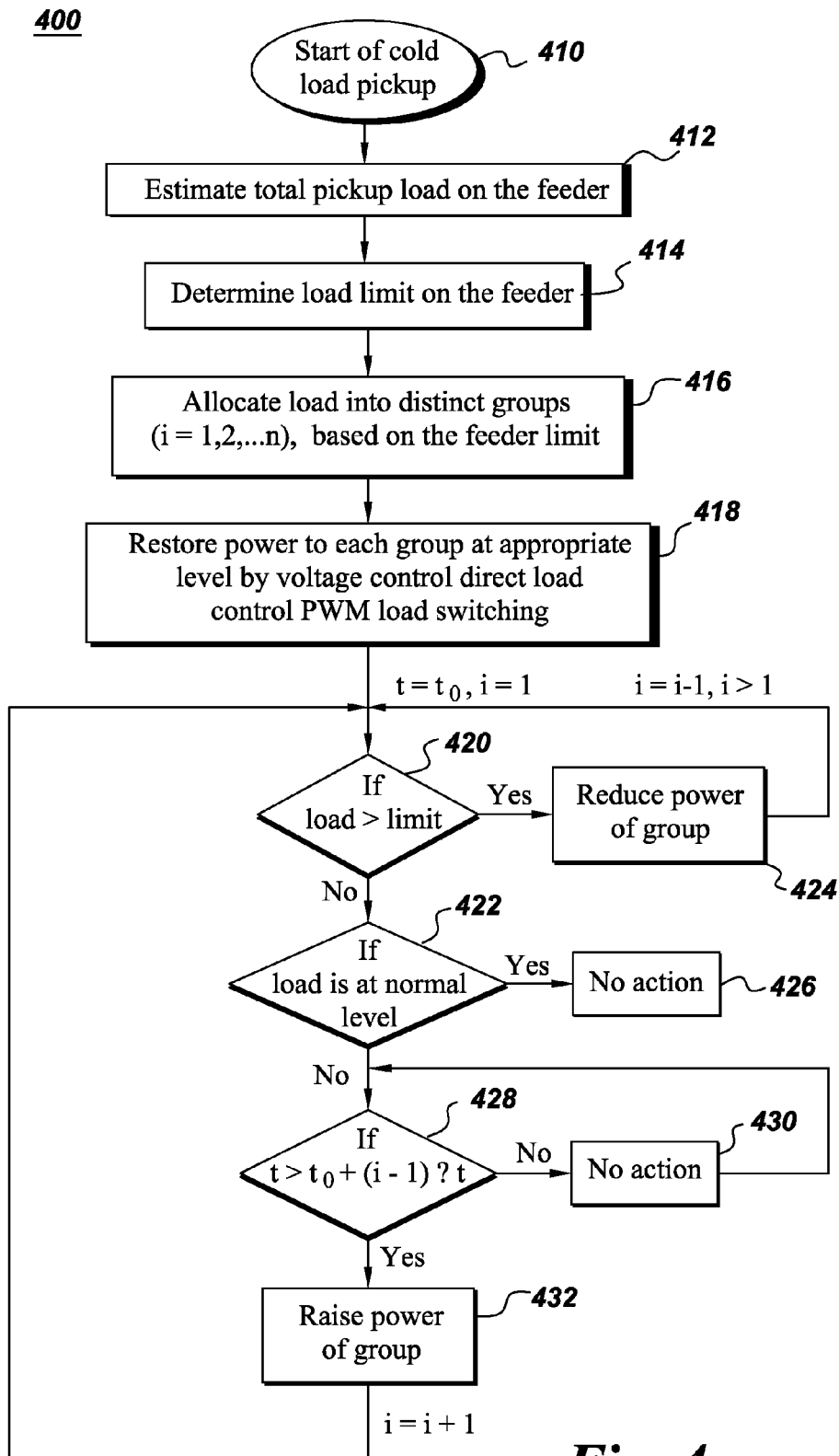
FIG. 4 illustrates a flow diagram for a cold load pickup power restoration method according to an exemplary embodiment.

According to this exemplary embodiment, devices that operate using synchronized low-frequency PWM modulate the instantaneous demand in an on/off manner with a relatively long period (on the order of minutes, for example). Further the PWM periods of each device in the population are synchronized, which means that the frequency and start time of the PWM periods are identical. As with all PWM operated devices, it is possible to adjust the saturation of the device's control input such that the maximum on-time during a given period can be reduced. When the saturation becomes variable, the energy (i.e., average demand) can be modulated by a higher-level controller, and when all devices are synchronized, a single global variable can control the demand of the entire population. For example, for cold load pickup, the saturation of each device can be controlled directly by a supervisory controller. The supervisory controller sends out a global signal to all of the devices specifying the saturation value. When the saturation value is slowly ramped up, the aggregate demand will slowly increase, resulting in controlled cold load pickup FIG. 4 shows a flow diagram for restoring power to a distribution network according to an exemplary embodiment. The process 400 includes step 410, which is the start of the cold load pickup power restoration. In step 412, the total load to be picked up on the feeder is estimated. This can be estimated through historical data and knowledge of the demographics on the feeder. For example, a lot of commercial customers would imply heavy concentration of lighting and motor loads. These parameters should be used to estimate the undiversified load demand on the feeder. The load limit on the feeder is determined in step 414. The load limit on the feeder is fixed by the electrical rating of the cables and the transformers. In step 416, the loads on the feeder are divided into blocks or groups (i=1, 2, . . . n), based on the load limit on the feeder. This is to ensure that if a certain block of load is raised to rated conditions, the peak undiversified demand never increases the feeder load limit. In step 418, power is restored to each block simultaneously using a power restoration process including, but not limited to, demand response load control, voltage control and/or PWM switching. The power is restored to rated conditions to critical loads and at reduced levels to non-critical loads. In step 420, at time $t=t_0$, it is determined whether the power demand on the feeder is greater than the feeder limit. If the answer in step 420 is yes, then processing continues to step 424 and power to the loads that are online is reduced, in order to bring the power demand on the feeder within limits. If the answer in step 420 is no, then processing continues to step 422 where it is determined whether the load on the feeder is at a normal feeder load level. The normal load level is the full diversified power demand on the feeder. This can be estimated from historical load data and weather information. If the answer in step 422 is yes, then processing continues to step 426 and no action is taken, implying that the feeder has been restored. If the answer in step 422 is no, then processing continues to step 428. In step 428, it is determined whether $t>t_0+(i-1)\Delta t$, where i is the index that refers to group, and $\Delta t$ is the time interval/step before additional load is picked up on the feeder. This control can manifest as a load pocket being raised to rated conditions or the entire non-critical load being raised to the next intermediate level. If the answer in step 428 is no, then processing continues to step 430 and no action is taken and processing continues. If the answer in step 428 is yes, then processing continues to step 432. In step 432, additional load is picked up on the feeder. Additional load can be the next load pocket being raised to rated conditions or the entire fleet of non-critical load being ramped up to a higher (but intermediate) value. Processing then continues to step 420 until all of the groups are processed or the entire load is restored.

According to the exemplary process 400, the critical loads are energized to rated conditions. The non-critical loads are energized at reduced power levels and their power demand is managed through one of the exemplary strategies including, but not limited to, demand response load control, voltage control and/or PWM switching. In other words, the non-critical loads are either turned on selectively in each pocket/group to rated power via a distribution management system, or they are controlled to be picked up at reduced power via voltage control or low frequency PWM. After a certain delay, the first pocket or group of non-critical loads is raised to its rated power level. Once this load pocket starts operating at its steady state, the next group of load is given full power. This process is continued until the last load pocket starts to operate at rated conditions. Alternatively, the power demand of the entire fleet of non-critical loads can be controlled to slowly ramp up from a reduced level to full rated conditions. At any point, if the power demand exceeds the feeder limit, the input power to the previous group(s) or the loads online is reduced and the whole process is repeated. The voltage control or PWM strategy can only be applied if the loads are capable of operating at reduced power levels.

Although embodiments of the invention have been described with reference to processing of a single demand response program, the invention is not limited in this regard. The clustering according to embodiments of the present invention can be performed for multiple programs.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method, comprising:
  estimating pickup load on a feeder in a distribution network;
  determining a load limit on the feeder;
  dividing load on the feeder into groups based upon the load limit of the feeder and based upon the estimated pickup load;
  identifying a power restoration control process for restoring power to each of the groups; and
  restoring power to each of the groups simultaneously based on the power restoration control process;
  wherein identifying the power restoration control process comprises:

identifying pulse width modulation loads on the feeder operating using pulse width modulation;
controlling a saturation of the pulse width modulation loads; and
restoring power to the pulse width modulation loads using on/off modulation.

2. The method of claim 1, wherein identifying the power restoration control process comprises:
identifying a demand response restoration load control process;
identifying premises in each of the groups that participate in a demand response program;
identifying demand response loads; and
determining restoration load control parameters based on the premises and the demand response loads to restore power to non-demand response loads before restoring power to demand response loads at the premises in each of the groups.

3. The method of claim 2, wherein the demand response loads comprises at least one of appliances, sensors, renewable energy resources, plug in electric vehicles, or plug in hybrid electric vehicles.

4. The method of claim 2, wherein restoring power comprises:
selectively controlling power to the demand response loads.

5. The method of claim 4, wherein selectively controlling power comprises:
supplying power to the demand response loads one group at a time.

6. The method of claim 5, wherein selectively controlling power comprises:
initiating control signals for at least one of voltage control or pulse width modulation.

7. The method of claim 2, further comprising:
restoring power to the demand response loads a group at a time on the feeder.

8. The method of claim 2, further comprising:
restoring power with a controlled ramp rate to all the demand response loads on the feeder.

9. The method of claim 1, wherein identifying the power restoration control process comprises:
identifying a voltage control restoration load control process;
determining a voltage control parameter corresponding to a reduced voltage for restoring power to the loads in each of the groups; and
applying the voltage control parameter for restoring power.

10. The method of claim 9, further comprising:
determining when the feeder is within a predetermined range of steady state operations; and
increasing the voltage supplied to each of the groups to a rated voltage.

11. The method of claim 10, wherein at least some of the loads on the feeder are resistive loads.

12. A non-transitory computer-readable medium comprising computer-readable instructions of a computer program that, when executed by a processor, cause the processor to perform a method, comprising:
estimating pickup load on a feeder in a distribution network;
determining a load limit on the feeder;
dividing load on the feeder into groups based upon the load limit of the feeder and based upon the estimated pickup load;
identifying a power restoration control process for restoring power to each of the groups; and restoring power to each of the groups simultaneously based on the power restoration control process;
wherein identifying the power restoration control process comprises:
identifying pulse width modulation loads on the feeder operating using pulse width modulation;
controlling a saturation of the pulse width modulation loads; and
restoring power to the pulse width modulation loads using on/off modulation.

13. The non-transitory computer-readable medium of claim 12, wherein identifying the power restoration control process comprises:
identifying a demand response power restoration control process;
identifying premises in each of the groups that participate in a demand response program;
identifying demand response loads; and
determining restoration load control parameters based on the premises and the demand response loads to restore power to non-demand response loads before restoring power to demand response loads at the premises in each of the groups.

14. The non-transitory computer-readable medium of claim 13, wherein restoring power comprises:
selectively controlling power to the demand response loads.

15. The non-transitory computer-readable medium of claim 14, wherein selectively controlling power comprises:
supplying power to the demand response loads one group at a time.

16. The non-transitory computer-readable medium of claim 14, wherein selectively controlling power comprises:
restoring power with a controlled ramp rate to all the demand response loads on the feeder.

17. The non-transitory computer-readable medium of claim 14, wherein selectively controlling power comprises:
initiating control signals for at least one of voltage control or pulse width modulation.

18. The non-transitory computer-readable medium of claim 12, further comprising:
restoring power to the demand response loads a group at a time on the feeder.

19. The non-transitory computer-readable medium of claim 12, wherein identifying the power restoration control process comprises:
determining a voltage control parameter corresponding to a reduced voltage for restoring power to the loads each of the groups; and
applying the voltage control parameter for restoring power.

20. The non-transitory computer-readable medium of claim 19, further comprising:
determining when the feeder is within a predetermined range of steady state operations; and
increasing the voltage supplied to each of the groups to a rated voltage.

21. A system, comprising:
loads connected to a utility network; and
a power restoration module communicatively coupled to the loads and one or more utilities, wherein the power restoration module is configured to:
estimate pickup load on a feeder in a distribution network;
determine a load limit on the feeder,
divide load on the feeder into groups based upon the load limit of the feeder and based upon the estimated pickup load;

identify a power restoration control process for restoring power to each of the groups;
restore power to each of the groups simultaneously based on the power restoration control process;
wherein the power restoration module is further configured to:
identify pulse width modulation loads on the feeder operating using pulse width modulation;
control a saturation of the pulse width modulation loads; and
restore power to the pulse width modulation loads using on/off modulation.

22. The system of claim 21, further comprising:
a database coupled to the power restoration module for storing power restoration programs.

23. The system of claim 21, wherein the power restoration module is further configured to:
identify premises in each of the groups that participate in a demand response program;
identify demand response loads; and
determine restoration load control parameters based on the premises and the demand response loads to restore power to non-demand response loads before restoring power to demand response loads at the premises in each of the groups.

24. The system of claim 21, wherein the power restoration module is further configured to:
determine a voltage control parameter corresponding to a reduced voltage for restoring power to the loads each of the groups; and
apply the voltage control parameter for restoring power.

* * * * *